(12) United States Patent
Johnson

(10) Patent No.: US 11,489,185 B2
(45) Date of Patent: Nov. 1, 2022

(54) JOHNSON POWER GENERATOR

(71) Applicant: Lonnie G Johnson, Atlanta, GA (US)

(72) Inventor: Lonnie G Johnson, Atlanta, GA (US)

( * ) Notice: Subject to any disclaimer, the term of this patent is extended or adjusted under 35 U.S.C. 154(b) by 111 days.

(21) Appl. No.: 16/876,212

(22) Filed: May 18, 2020

(65) Prior Publication Data

US 2021/0359320 A1    Nov. 18, 2021

(51) Int. Cl.
*H01M 8/1004*    (2016.01)
*H01M 8/1009*    (2016.01)

(52) U.S. Cl.
CPC ....... *H01M 8/1004* (2013.01); *H01M 8/1009* (2013.01)

(58) Field of Classification Search
CPC .................. H01M 8/1004; H01M 8/1009
See application file for complete search history.

(56) References Cited

U.S. PATENT DOCUMENTS

| 2002/0172844 A1* | 11/2002 | Ito | H01M 8/241 |
| | | | 429/422 |
| 2015/0211132 A1* | 7/2015 | MacKinnon | H01M 8/026 |
| | | | 429/422 |

* cited by examiner

*Primary Examiner* — Helen Oi K Conley
(74) *Attorney, Agent, or Firm* — Baker Donelson Bearman Caldwell & Berkowitz PC

(57) ABSTRACT

An generator that uses on the heat of condensation of water vapor as an energy source to produce electrical power. A hygroscopic, membrane electrode assembly is configured having an ion conductive hygroscopic electrolyte sandwiched between a pair of electrodes. One electrode is in contact with the water and the other electrode being in contact with a water vapor source whereby an electrochemical potential differential is produced across an electrical load by the reaction potential of the hygroscopic electrolyte with water vapor relative to the electrolyte's reaction potential with the liquid water. Power is supplied to an external load connected between the electrodes with water vapor being electrolyzed at the electrode that is in contact with water vapor and liquid water being reduced at the electrode that is in contact with liquid water.

6 Claims, 5 Drawing Sheets

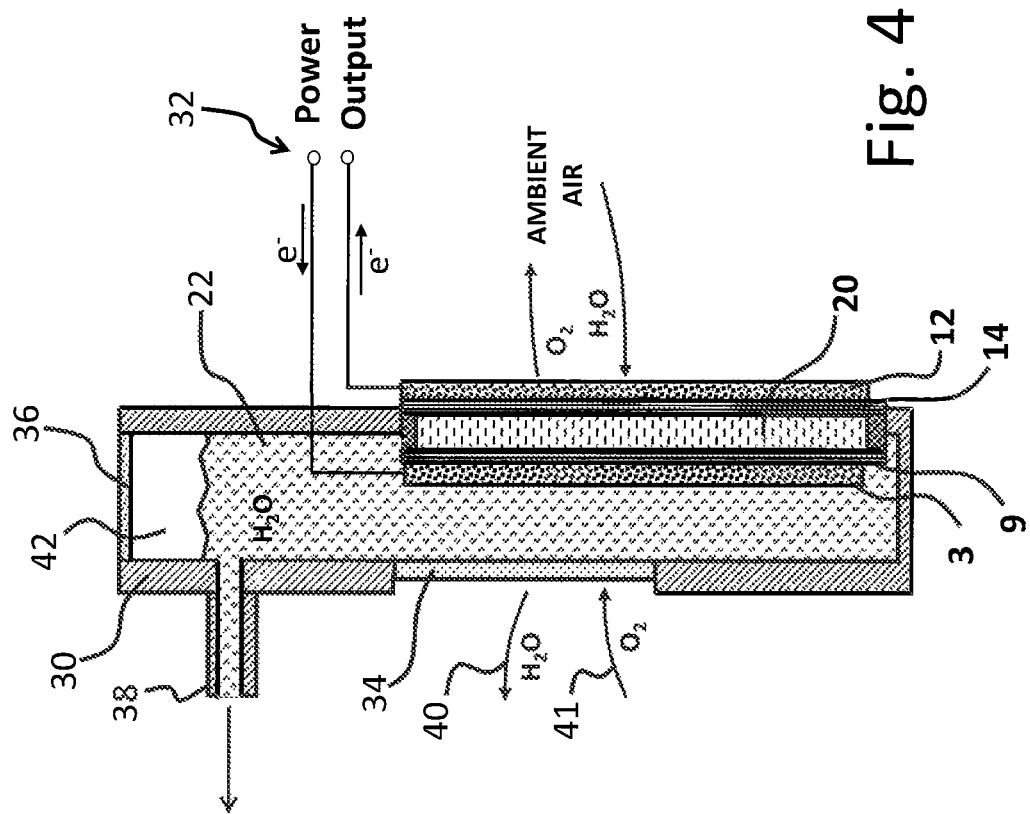

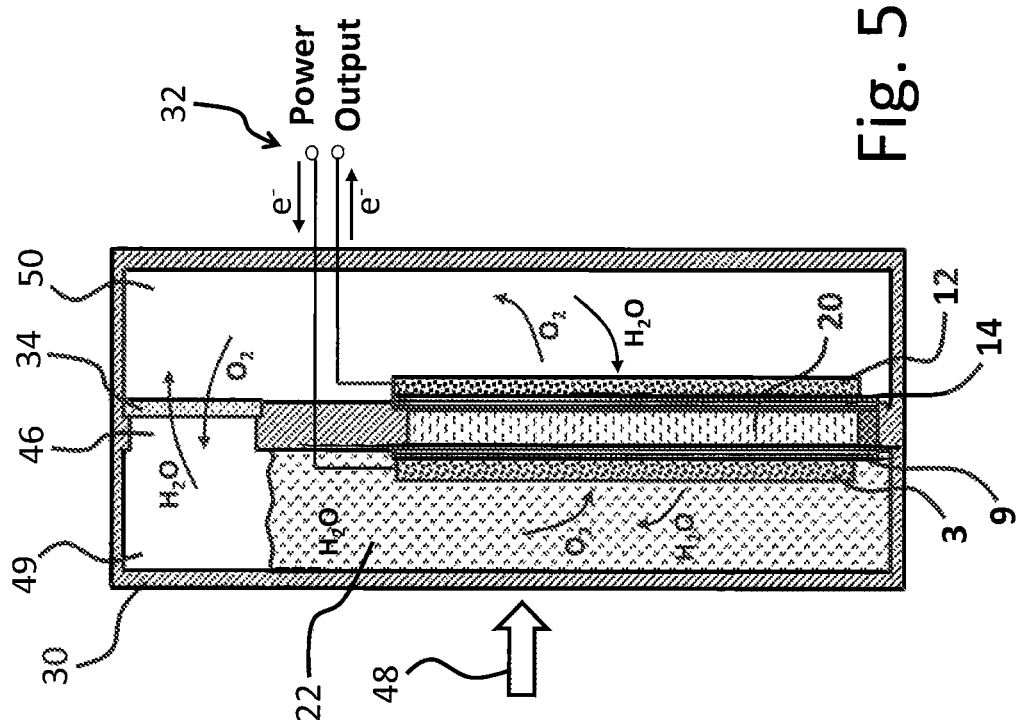

JOHNSON POWER GENERATOR

CROSS-REFERENCE TO RELATED APPLICATIONS

There are related applications; but, we are not claiming any priority based on their filing dates.

BACKGROUND OF THE INVENTION

Prior art has generally taught concentration cells that require membranes that conducts ions of the gas for which the concentration differential applies. The present invention relates to atmospheric energy harvesting and atmospheric water condensation. U.S. Provisional Patent Application No. 62/975,502 filed Feb. 12, 2020 disclosed generation of electrical power using a membrane electrode assembly for electrochemical reactions similar to those disclosed herein; that application introduced the idea of using a hygroscopic solution to create a water vapor pressure differential to attract and condense atmospheric water into the solution itself while generating electrical power. That approach is limited by the capacity of the hygroscopic solution in reaching saturation equilibrium with the water vapor pressure in its environment. It is therefore limited to operating on cyclic variations in ambient water vapor pressure. Alternatively patent application No. 62/986,177 (provisional), filed Mar. 6, 2020 for a application Concentration Energy Converter, includes the generation power by effectively evaporating of water through an ion conductive membrane electrode assembly. Water is electrolyzed on the entering side of the membrane electrode assembly with oxygen being released while protons are conducted through the separating membrane and electrons are conducted through an external load. The protons and electrons react with oxygen at the exiting electrode to reconstitute water as vapor. That invention is limited by the need for continuous consumption of water.

A great deal of research and development has been invested towards the development of power generation technology. It has long been a goal to develop an engine that can harvest thermal energy that is freely available in the ambient environment to produce electrical power. Conventional power generators require a simultaneous temperature differential for operation. For ambient energy harvesting applications, attempts have been made to utilize thermal insulation material and a heat sink to impose the needed differential. One section of a converter is thermally insulated from the environment and/or coupled to a high heat capacity material so as to delay changes in its temperature relative to temperature changes in its environment. The lag in temperature change relative to the section that is exposed and thermally coupled to the environment thus creates the required temperature differential needed for the converter to operate. The need to include a heat capacity material and thermal insulation limits the practicality of such a device. Further, conversion effectiveness decreases as parasitic heat conduction through the device's structure becomes more and more overwhelming as the size of the device is reduced. The present invention does not have these limitations.

In more conventional electrical power generation applications, a primary heat source such as solar, nuclear, fuel combustion, geothermal or other source may be used whereby the source supplies heat at elevated temperature relative to the ambient environment. The ambient environment with active cooling such as water evaporation is employed as a lower temperature heat sink to create the needed temperature differential. Generally, these systems are plagued by negative environmental impacts and costs. Solar photovoltaic, solar cells, have limited efficiency and relatively high cost which makes operational competitiveness a challenge. In an effort to limit the negative environmental impacts of fossil fuel use, concentrated solar thermal and nuclear systems have received a great deal of attention. Generally these systems operate on a Rankine based steam cycle that requires expensive, complex mechanical turbine stages with intercoolers and re-heaters to improve efficiency, yet they remain limited in their energy conversion efficiency. At the large utility power plant scale, these systems have the additional negative environmental impact of consuming very large amounts of water in order to extract heat from and condense steam in maintaining the required temperature differential.

This there is a long standing need for a ubiquitous electrical power source that is continuous and reliable and that does not negatively impact the environment. It is this need that the present invention addresses.

SUMMARY OF THE INVENTION

The present invention teaches the use canceling electrolyzing and reduction reactions as a means for extracting energy from a reaction potential differential. It is driven by an electrochemical reaction potential differential between a hygroscopic solution and water vapor at one electrode and condensed, liquid water at the other. Its operating principal is based on the thermo-galvanic effect wherein the voltage of an electrochemical cell is a direct function of its temperature and reactant concentration differentials. Ideally, when operating on ambient energy, the entire engine functions to maintain a state of thermal equilibrium with its environment. More specifically, the invention may be employed to generate electrical power while condensing water vapor without the use of an external energy source other than the atmospheric water vapor being condensed. The invention includes membrane electrode assembly comprising a membrane that is conductive of ions of a material and having a reaction potential with the material wherein the reaction potential depends on whether the species is in a gas or liquid phase. The membrane electrode assembly is sandwiched between a volume of gas and a volume of liquid wherein the electrode interfacing the material having the higher reaction potential nominally the vapor phase, with the electrolyte drives the reaction at the electrode interfacing the material having the lower potential with the electrolyte in reverse.

In a preferred embodiment, the invention is employed in an atmospheric water/steam cycle. Steam has a higher reaction potential with a hygroscopic electrolyte due to the availability of energy of condensation. Steam can only enter the hygroscopic solution by being electrolyzed at a first electrode on one side of the hygroscopic electrolyte. A hydrogen permeable barrier is presented at the first electrode to prevent direct condensation of steam into the electrolyte without being electrolyzed. Thus only protons get through with oxygen being released back to the surrounding environment. The electrons are routed through an external load. The electrode on the opposite side of the electrolyte interfaces with liquid water. Water in the liquid phase has a concentration reaction potential with the electrolyte which is nominally lower thin the reaction potential of the steam which is at the opposite electrode. As such, the reaction at the water interfacing electrode is driven in reverse. Protons conducted into the electrolyte from the steam side are conducted out of the electrolyte and into the water on the water side. Protons entering the electrode on the water side combine with electrons entering the electrode from the external load and react with dissolved oxygen from the water to produce water.

Although hydrogen is not available in the system as a gas, the invention uses a membrane that is hydrogen ion conductive to effectively operate as a water ion conductor and condenser. Multiple cells may be configured in an electrically connected series array to achieve useful voltage levels. A load controller monitors the voltage level and extracts current when voltage levels are sufficient to provide useful energy.

BRIEF DESCRIPTION OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings:

FIG. 4 shows an embodiment of the invention including a housing with a porous hydrophobic membrane for diffusion of ambient oxygen into the water being produced.

FIG. 5 shows a closed thermodynamic cycle converter and configured having a housing with a hygroscopic membrane electrode assembly coupled between a water vapor chamber and a liquid water chamber.

SUMMARY OF THE INVENTION

Figure 1:
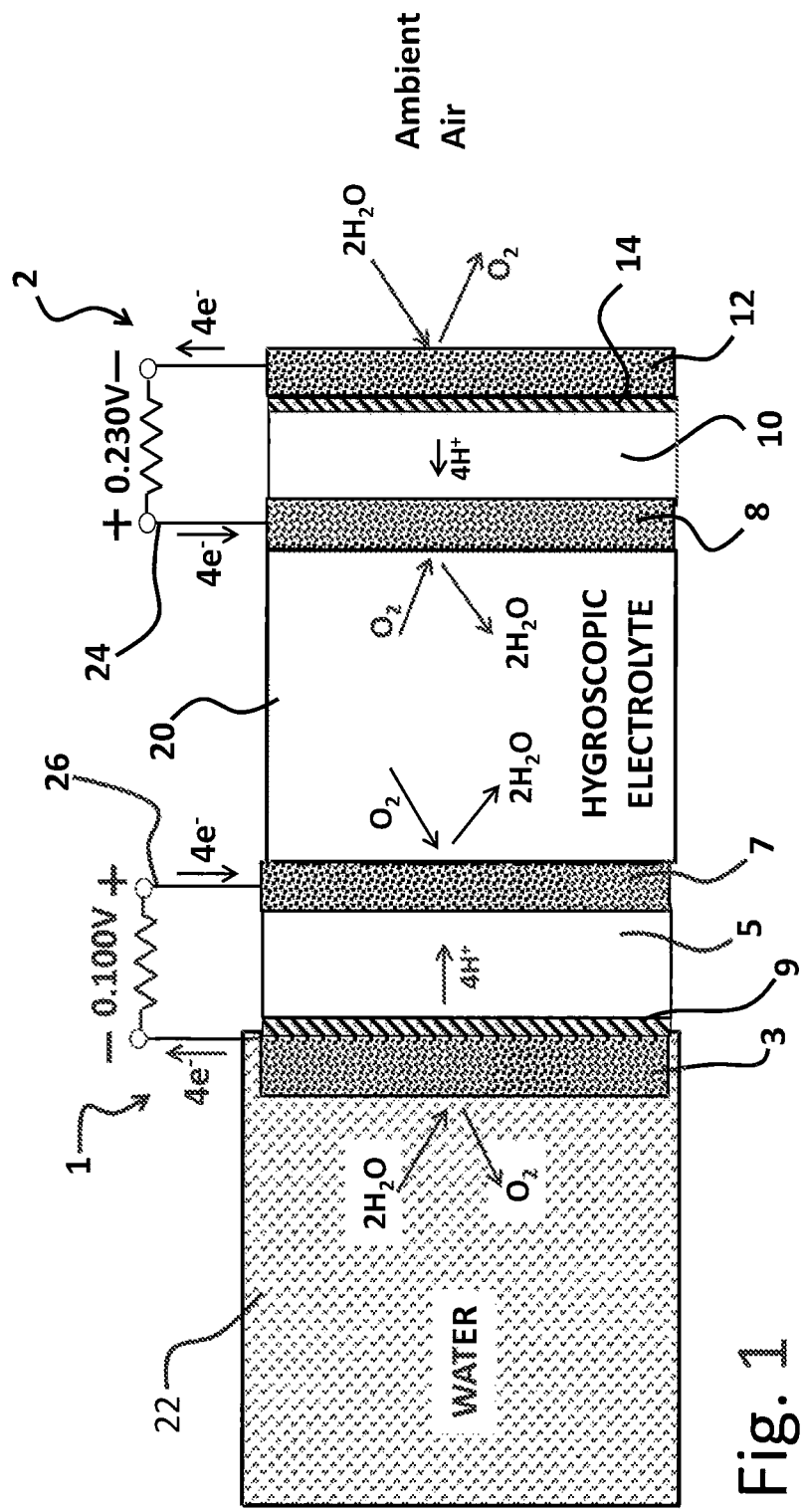
FIG. 1 shows the electrochemical potentials of two back to back proton conductive membrane electrode assemblies (MEA) sandwiching a hygroscopic electrolyte with one of the MEA having its exterior electrode in contact with ambient air containing water vapor and with the other MEA having a lower potential because of having its exterior electrode in contact with liquid water instead of water vapor.

The present invention teaches the use canceling electrolyzing and reduction reactions as a means for extracting energy from a reaction potential differential. It is driven by an electrochemical reaction potential differential between a hygroscopic solution and water vapor at one electrode and condensed, liquid water at the other. Its operating principal is based on the thermo-galvanic effect wherein the voltage of an electrochemical cell is a direct function of its temperature and reactant concentration differentials. Ideally, when operating on ambient energy, the entire engine functions to maintain a state of thermal equilibrium with its environment. More specifically, the invention may be employed to generate electrical power while condensing water vapor without the use of an external energy source other than the atmospheric water vapor being condensed. The invention includes membrane electrode assembly comprising a membrane that is conductive of ions of a material and having a reaction potential with the material wherein the reaction potential depends on whether the species is in a gas or liquid phase. The membrane electrode assembly is sandwiched between a volume of gas and a volume of liquid wherein the electrode interfacing the material having the higher reaction potential nominally the vapor phase, with the electrolyte drives the reaction at the electrode interfacing the material having the lower potential with the electrolyte in reverse.

In a preferred embodiment, the invention is employed in an atmospheric water/steam cycle. Steam has a higher reaction potential with a hygroscopic electrolyte due to the availability of energy of condensation. Steam can only enter the hygroscopic solution by being electrolyzed at a first electrode on one side of the hygroscopic electrolyte. A hydrogen permeable barrier is presented at the first electrode to prevent direct condensation of steam into the electrolyte without being electrolyzed. Thus only protons get through with oxygen being released back to the surrounding environment. The electrons are routed through an external load. The electrode on the opposite side of the electrolyte interfaces with liquid water. Water in the liquid phase has a concentration reaction potential with the electrolyte which is nominally lower than the reaction potential of the steam which is at the opposite electrode. As such, the reaction at the water interfacing electrode is driven in reverse. Protons conducted into the electrolyte from the steam side are conducted out of the electrolyte and into the water on the water side. Protons entering the electrode on the water side combine with electrons entering the electrode from the external load and react with dissolved oxygen from the water to produce water.

Although hydrogen is not available in the system as a gas, the invention uses a membrane that is hydrogen ion conductive to effectively operate as a water ion conductor and condenser. Multiple cells may be configured in an electrically connected series array to achieve useful voltage levels. A load controller monitors the voltage level and extracts current when voltage levels are sufficient to provide useful energy.

BRIEF DESCRIPTION OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings:

FIG. 1 shows the electrochemical potentials of two back to back proton conductive membrane electrode assemblies (MEA) sandwiching a hygroscopic electrolyte with one of the MEA having its exterior electrode in contact with ambient air containing water vapor and with the other MEA having a lower potential because of having its exterior electrode in contact with liquid water instead of water vapor.

Figure 2:
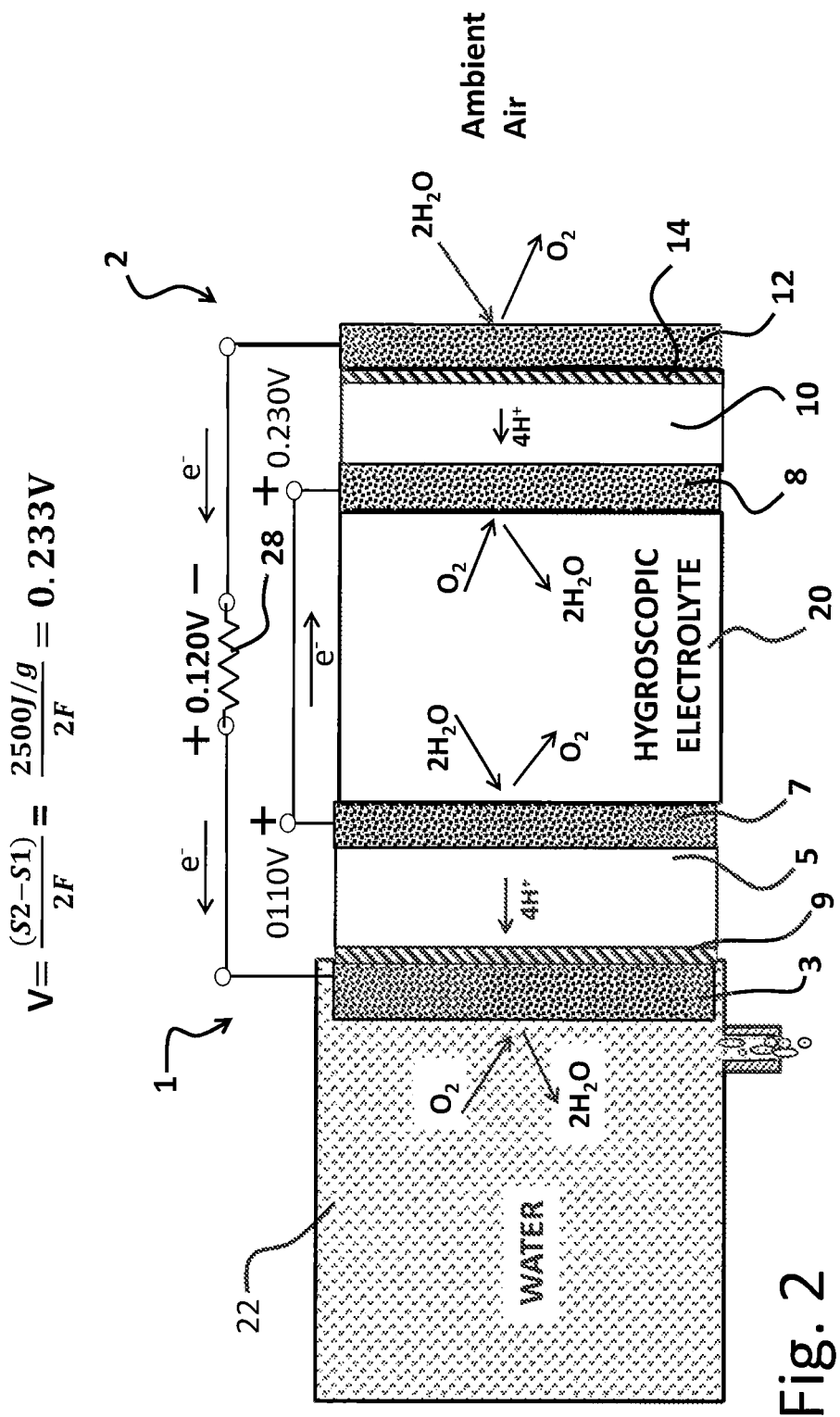
FIG. 2 shows the cells of FIG. 1 being electrically connected in series such that the higher voltage cell drives the lower voltage cell in reverse.

FIG. 2 shows the cells of FIG. 1 being electrically connected in series such that the higher voltage cell drives the lower voltage cell in reverse.

Figure 3:
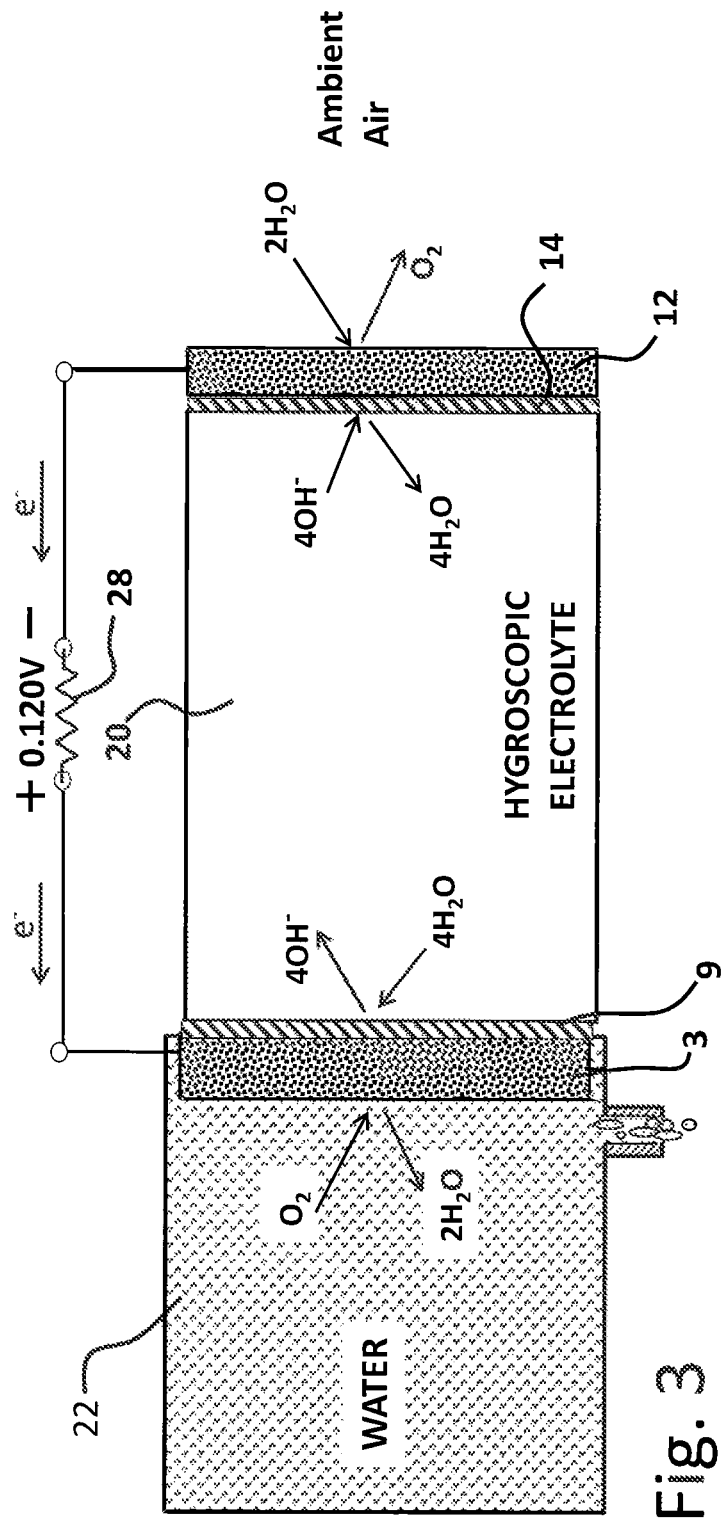
FIG. 3 shows the equivalent circuit of FIG. 2 with the intermediate electrodes eliminated.

FIG. 3 shows the equivalent circuit of FIG. 2 with the intermediate electrodes eliminated.

FIG. 4 shows an embodiment of the invention including a housing with a porous hydrophobic membrane for diffusion of ambient oxygen into the water being produced.

FIG. 5 shows a closed thermodynamic cycle converter and configured having a housing with a hygroscopic membrane electrode assembly coupled between a water vapor chamber and a liquid water chamber.

DETAILED DESCRIPTION OF THE INVENTION

FIG. 1 shows the electrochemical potentials of two back-to-back, proton conductive, membrane electrode assemblies sandwiching and each having one its electrodes in contact with hygroscopic first electrolyte 20. First membrane electrode assembly (MEA) 1 is comprised second proton conductive electrolyte membrane 5 sandwiched by first electrode 3 and third electrode 7. It optionally includes first hydrogen permeable barrier to molecular water 9. First electrode 3 is exposed in in contact with water and third electrode 7 is in contact with first hygroscopic electrolyte 20. Similarly, second membrane electrode assembly (MEA) 2 is comprised third proton conductive membrane 10 sandwiched by fourth electrode B and second electrode 12. It optionally includes second hydrogen permeable barrier to molecular water 14. Electrodes 12 is exposed to the ambient air which contains water vapor and electrode 8 is in contact with hygroscopic electrolyte 20.

MEA 2 are shown as having higher electrochemical potential relative to MEA1. The higher potential of MEA 2 is due to the higher entropy change associated with transition from vapor into an absorbed liquid within the hygroscopic solution versus the lower entropy change associated with transitioning from liquid water into absorbed liquid water within the solution. Operation of the configuration shown in FIG. 1 can be understood by first examining MEA 2. Under attraction by the hygroscopic electrolyte, ambient water vapor enters electrode 12 and is oxidized into protons $4H^+$ with the resulting oxygen being released back to the environment. Protons from the reaction are conducted through membrane 10 to electrode 8 as electrons are routed through external load circuit 24. The protons and electrons entering electrode 8 react with dissolved oxygen available in the hygroscopic solution to produce water. The net effect is the generation of electrical power by electrochemical reactions driven by the absorption of water vapor by the hygroscopic electrolyte. Similarly, under the attraction by the hygroscopic electrolyte, liquid water enters electrode 3 and is oxidized into protons $4H^+$ with the resulting oxygen being released back to the water. The resulting protons are conducted through membrane 5 to electrode 7 as electrons are routed through external load circuit 26. The protons and electrons entering electrode 7 react with dissolved oxygen available in the hygroscopic solution to produce water. The net effect is the generation of electrical power by electrochemical reactions driven by the absorption of water vapor by the hygroscopic electrolyte but at lower voltage relative to that produced by MEA 2.

Ideally, ion conductive membrane 10 has high barrier properties and prevents the migration of water molecules to the low vapor pressure side without being electrolyzed. Thin ion conductive barriers 9 and 14 are optionally included to prevent such migration. Many proton conductive membrane materials—Nafion is a good example—are themselves hygroscopic and require water as a necessary component to promote ion conduction. Barriers 9 and 14 prevent water from passing through or from being absorbed or condensing into the electrolyte without being electrolyzed. The barrier layer may be a hydrogen permeable metal such as palladium or tantalum or it may be a proton conductive barrier material such as yttrium-doped barium zirconate, YBaZrO3.

As illustrated in FIG. 1, an electrochemical potential differential is produced between MEA 1 and MEA 2 as the hygroscopic electrolyte reaction potential difference with water vapor versus liquid water. Referring to FIG. 2, it shows the cells of FIG. 1 electrically connected in series such that the higher voltage MEA 2 drives the lower voltage MEA 1 in reverse. Electrodes 7 and 8 are electrically connected to each other. External load 28 is electrically connected between electrodes 3 and 12. Because of its higher voltage, MEA 2 supplies power to both MEA 1 and to load 28. The reverse voltage and current applied to MEA 1 causes water in hygroscopic electrolyte 20 to be electrolyzed at electrode 7 as electrons are striped and conducted to electrode 8 of MEA 2. Electrons supplied by electrode 12 to electrode 3 reduces protons conducted to electrode 3 through membrane 5 where they combine and react with dissolved oxygen available in water 22 to produce water.

FIG. 3 shows an embodiment of the invention with intermediate electrodes 7 and 8 removed. The proton conductive membrane is also removed and the hygroscopic electrolyte is in direct contact with barriers 9 and 14. In this configuration, atmospheric water vapor attracted to the hygroscopic electrolyte is electrolyzed at electrode 12 with the resulting protons being conducted into solution 20 where they react with hydroxide ions, $4OH^-$, to produce water. Oxygen is released back to the ambient air and electrons are conducted through load 28 to electrode 3. Simultaneous with the reactions at electrode 12, water within the hygroscopic electrolyte is electrolyzed at electrode 3 producing hydroxide ions, $4OH^-$. The resulting protons are conducted to electrode 3 where they are reduced by electrons supplied through load 28 and react with dissolved oxygen available in water 22 to produce water. As discussed, barriers 9 and 14 may be hydrogen permeable metal or it may be a proton conductive electrolyte material.

As an example, consider the entropy changes that the hydrogen, oxygen and water undergo in transitioning through the cell. The reactions at the hygroscopic solution interface with electrodes 9 and 14 are symmetric and therefore counterbalance each other with a net zero impact except for resistive and activation loses. The absorption potential of the solution actually cancels out as the energy of formation on the entering side of the electrolyte equals the energy of desorption on the exiting side as there is no temperature or pressure difference across the cell. Thus the voltage potential of the cell is given by:

Condensation $$V = \frac{(S)H2Ogas}{2F} - 0.5\text{mole}\frac{(S)O2gas}{2F} - 0.5\text{mole}\frac{(S)O2liq}{2F} - \frac{RT}{2F}\text{Ln}\left(\frac{Psat}{Patm}\right)$$

$$= \frac{\frac{144J}{moloK}*300oK}{2F} - 0.5*\frac{\frac{(205)J}{moloK}*300oK}{2F} +$$

$$0.5*\frac{\frac{(110.9)J}{moloK}*300oK}{2F} - \frac{8.25*300oK}{2F}\text{Ln}\left(\frac{Psat}{Patm}\right)$$

$$V = 0.224 - 0.0667 - 0.086 + 0.0128 = 0.0833$$

Where R is the gas constant (8.25 kJ/mol° K.), T is the cell operating temperature, F is Faraday's constant (96,487 Coulombs/mole), (s)H2O gas is the condensation entropy of water vapor; (s)O2gas is the entropy of the oxygen released from the electrode 12 back to the atmosphere and (s)O2Liq is the entropy of the available oxygen dissolved in the water. Since dissolved oxygen is already available within the water, it must be deleted from the water condensation entropy. Patm/Psat is the ratio of ambient water vapor pressure to the saturated vapor pressure of the water. Patm/Psat gives the Nernst potential of the cell due to the concentration difference between liquid water and ambient air which would cause water to evaporate through the cell in the direction opposite that of absorption. Electrochemical potentials are evaluated at room temperature (300 K). Here Psat is the saturation pressure of water at 300° C., 4.5 kpa and the relative humidity is assumed to be 30% for a Patm of 1.5 kpa.

The evaporation process is different from the condensation process considering the initial and final states of the oxygen, hydrogen and water. For evaporation, entropy of formation is supplied to the cell to form aqueous hydrogen ions which are subsequently conducted through the cell. $(s)H^+aq$ is the entropy of Hydrogen formation from solution, $(s)O_{2gas}$ is the entropy of oxygen gas, Psat/Patm gives the Nernst potential of the cell due to the concentration difference between liquid water and ambient air which would cause water to evaporate through the cell and $(s)H2Ogas$ is the entropy of the resulting water vapor. The overall cell voltage driven by the evaporation potential is given by the Nernst equation:

Evaporation $$V = \frac{(S)H + aq}{2F} + 0.5\text{mole}\frac{(S)O2gas}{2F} + \frac{RT}{2F}\text{Ln}\left(\frac{Psat}{Patm}\right) - \frac{(S)H2Ogas}{2F}$$

$$= 2*\frac{\frac{108J}{\text{moloK}}*300oK}{2F} + 0.5*\frac{\frac{(205)J}{\text{moloK}}*300oK}{2F} +$$

$$\frac{8.25*300oK}{2F}\text{Ln}\left(\frac{Psat}{Patm}\right) - \frac{\frac{144J}{\text{moloK}}*300oK}{2F}$$

$V = +0.334 + 0.110 + 0.0128 - 0.224 = 0.233$

FIG. 4 shows an embodiment of the invention that includes housing 30 for accumulating water and supplying it for external use via port 38. Housing 30 is fitted with a hygroscopic membrane electrode assembly comprising a hygroscopic electrolyte sandwiched between electrode 3 with barrier 9 on the external air side and electrode 12 with barrier 14 on the internal water side. The hygroscopic membrane electrode assembly couples power to an external load via terminals 32. The housing further includes ullage reservoir 42 fitted with breathable port 36 to accommodate changes in the amount of water stored within housing 30. Porous hydrophobic membrane 34 couples the water within housing 30 to the ambient air. It provides a path for ambient oxygen 41 to be continuously dissolved into water 22 as the oxygen is depleted therefrom at electrode 12. Given the abundance of oxygen in ambient air, membrane 34 is configured as a tortuous path by which sufficient oxygen can be supplied to water 22 to support the reactions at electrode 12 while minimizing loss of water by evaporation through the membrane. Although some amount of water 40 will be lost from the housing by evaporation through the porous membrane, it will be small relative to the amount of oxygen that enters and dissolves into the water inside.

FIG. 5 shows a closed cycle energy converter and configured having expanded housing 30 with a first chamber 49 and a second chamber 50. Chamber 50 encloses water vapor electrode 12 and is coupled to chamber 49 by port 46 which optionally includes porous hydrophobic membrane 34. Port 46 couples water vapor flow from chamber 49 to chamber 50 and oxygen flow from chamber 50 to chamber 49. As previously described, water vapor attracted to the hygroscopic electrolyte is electrolyzed at electrode 12 with the resulting protons being conducted into solution 20 where they react with hydroxide ions, 4OH⁻, to produce water. Oxygen is released back to the ambient air and electrons are conducted through an external load connected to terminals 32. Simultaneous with the reactions at electrode 12, within the hygroscopic electrolyte 20 is electrolyzed at electrode 3 producing hydroxide ions, 4OH⁻. The resulting protons are conducted to electrode 3 by barrier 9 where they are reduced by electrons supplied through load 28 and react with dissolved oxygen available in water 22 to produce water. The heat of evaporation needed to maintain operation of the converter is supplied by heat source 48.

A single MEA, such as MEA 1 or 2 of FIG. 2, can electrolyze and reduce water without encountering the 1.23 potential of the oxygen water reaction and without producing hydrogen gas. To be clear, first envision a cell where MEA 2 is supplied the required 1.23 volts to electrolyze water with the resulting oxygen being released back to the air and the hydrogen being transported MEA 1. If MEA 1 is configured to operate as a fuel cell it will generate 1.23 volts and produce water. If the two MEA are connected back to back the net voltage difference between the two will be zero. By applying a small voltage, significantly less than 1 volt, water can be consumed at one MEA with hydrogen being transported to the other MEA where it reacts with oxygen to produce water. The back to back MEA can be simplified to achieve the configurations of each of MEA 1 and 2 by removing the two inner electrodes similar to what was done to FIG. 2 to achieve FIG. 3 where the inner electrodes are removed and a single electrolyte is coupled between the outer electrodes. The new of a single MEA of membrane sandwiched between a pair of electrodes has the equivalent functionality of two back-to-back MEA for simultaneous electrolyze/reduction reactions. Each MEA will be capable of reducing water and electrolyzing water vapor using the low reaction potential of the hygroscopic solution with the water or the water vapor respectively, thus the single MEA configurations of MEA 1 and MEA 2 of FIGS. 1 and 2.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An energy converter for generating electrical power from water vapor utilizing an electrical load, oxygen, a water vapor source, and water, the energy converter comprising:

a water reservoir, the water being contained within the water reservoir and having the oxygen dissolved therein, a hygroscopic membrane electrode assembly, the hygroscopic membrane electrode assembly comprising a first electrode, a second electrode, a first hydrogen permeable barrier mounted adjacent the first electrode, a second hydrogen permeable barrier mounted adjacent the second electrode, and an ion conductive hygroscopic electrolyte positioned between the first hydrogen permeable barrier opposite the first electrode and the second hydrogen permeable barrier opposite the second electrode, to allow the first and second hydrogen permeable barriers to permit the passage of protons but prevent the passage of molecular water into the hygroscopic electrolyte to maintain the hygroscopic properties of the electrolyte and thereby the electrochemical potential of the converter the electrical load being connected between the first and second electrode, the first electrode being in contact with the water within the water reservoir and the second electrode being in contact with the water vapor source, whereby an electrochemical potential differential is produced across the electrical load by the reaction potential of the hygroscopic electrolyte with water vapor relative to the electrolyte's reaction potential with the liquid water.

2. The energy converter for generating electrical power from water vapor as disclosed in claim 1 wherein the hygroscopic electrolyte that produces the electrochemical potential differential driving a reaction at the second electrode that electrolyzes protons and electrons from water vapor and releases oxygen and a reaction at the first electrode that reacts protons and electrons with oxygen to produce water conducts protons from the second electrode to the first electrode to balance the reaction between the electrodes.

3. The energy converter for generating electrical power from water vapor as disclosed in claim 1 wherein the hygroscopic electrolyte that produces the electrochemical potential differential drives a reaction at the second electrode that electrolyzes protons and electrons from water vapor and releases oxygen and a reaction at the first electrode that reacts protons and electrons with oxygen to produce water facilitates ion reactions that provide the required ion transport balance between the electrodes.

4. The energy converter for generating electrical power from water vapor as disclosed by claim 1 further comprising:

a third electrode and a second electrolyte, the second electrolyte being sandwiched between the first electrode and the third electrode, a fourth electrode and a third electrolyte, the third electrolyte being sandwiched between the second electrode and the fourth electrode, the third and fourth electrodes being electrically connected to each other and in contact with the hygroscopic electrolyte, wherein the water is reduced into the hygroscopic electrolyte by reactions between dissolved oxygen available within the hygroscopic electrolyte with protons transported thereto by the third electrolyte and electrons supplied by the fourth electrode and the water is electrolyzed out of the hygroscopic electrolyte with oxygen being released thereto as protons are conducted by the second electrolyte to the first electrode and electrons are supplied from the third electrode to the fourth electrode.

5. The energy converter for generating electrical power from water vapor as described in claim 1 wherein the membrane electrode assembly comprises an array of membrane electrode assemblies that are electrically connected in series such that they provide a combined output voltage at a targeted value under prescribed water vapor pressure and temperature conditions.

6. The energy recovery converter for generating electrical power from water vapor as described in claim 5 further including an external heat source and a housing, the housing is configured having a liquid water chamber, a gas chamber and a port connecting the liquid water chamber and the gas chamber, the liquid water chamber enclosing the first electrode and the gas chamber enclosing the second electrode whereby the oxygen released into the gas chamber with the electrolyzing of water vapor therein at the second electrode is coupled by the port to the liquid water chamber where it dissolves into the water therein and reacts at the first electrode with protons and electrons supplied thereto to produce water, the heat source supplying heat of evaporation to the liquid water chamber for evaporation of water therefrom, the resulting water vapor being supplied to the gas chamber for reaction at the second electrode.

\* \* \* \* \*